May 16, 1944.   L. E. JOHNSON   2,348,981
BAIT RETAINER FOR ANIMAL TRAPS
Filed March 12, 1943
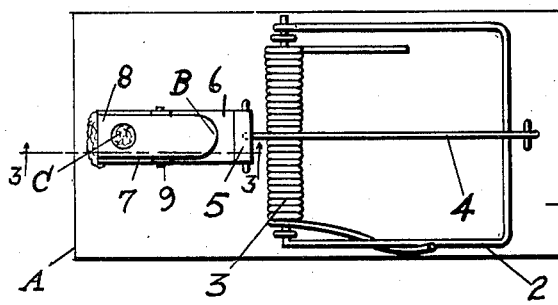
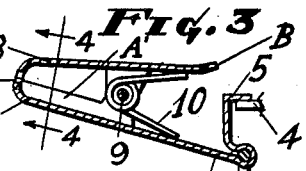
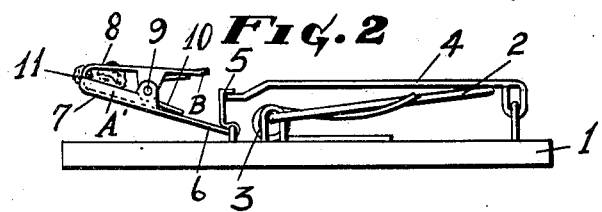
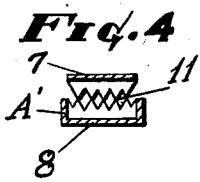
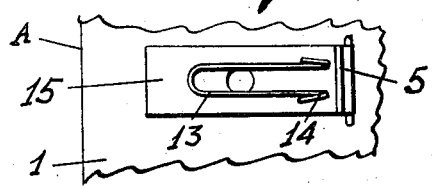
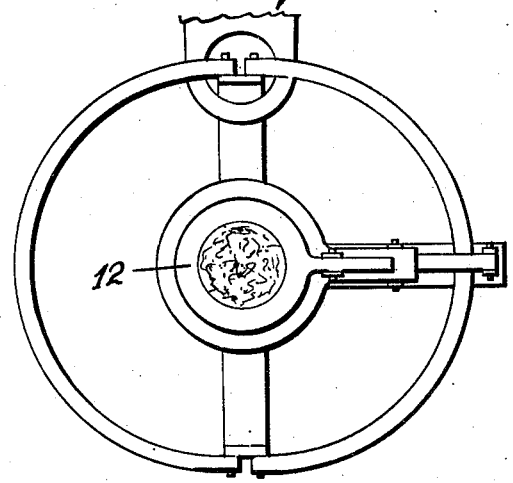
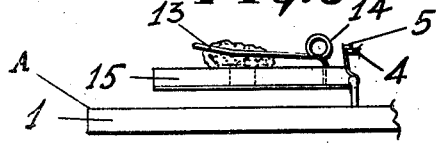
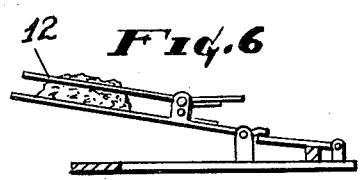
INVENTOR.
LEIGH E. JOHNSON
BY *H. G. Charles*

Patented May 16, 1944

2,348,981

UNITED STATES PATENT OFFICE 2,348,981

BAIT RETAINER FOR ANIMAL TRAPS

Leigh E. Johnson, Wichita, Kans.

Application March 12, 1943, Serial No. 478,930

2 Claims. (Cl. 43—81)

My invention herein disclosed relates to new and useful improvements in a bait retainer for animal traps, and has for its principal object a spring tensioned means to secure bait to the trip lever of the trigger arrangement of the trap, whereby one baiting of the trap will serve a number of times for repeated catching of animals, such as mice, rats, or animals having fur pelts of commercial value.

A further object of this invention is to provide a simple and efficient means to clamp the bait to the trigger lever by an apertured toothed jaw that is spring tensioned, the aperture to permit a portion of the bait extending therethrough for both visual and easy accessibility for the animal to the bait.

A still further object of this invention is to construct a bait carrying means inexpensive to manufacture, easily applied to the trap body, and efficient in its performance, and furthermore the bait holder adapted to retain solid or plastic like bait in such a way as to retain the same firmly against easy removal.

These and other objects will hereinafter be more fully explained, reference being had to the accompanying drawing forming a part of this specification, and in which like characters will apply to like parts in the different views.

Referring to the drawing:

Fig. 1 is a plan view of a conventional type of mouse or rat trap, embodying therewith the principal feature of the trigger and bait lever.

Fig. 2 is an edge or side view of Fig. 1, illustrating the trap as set for action.

Fig. 3 is an enlarged longitudinal section through the bait clamp and its trigger arrangement taken on line 3—3 in Fig. 1.

Fig. 4 is a cross section taken on line 4—4 in Fig. 3 to illustrate the teeth and pan like receptor for bait of thin plastic material.

Fig. 5 represents the invention as applied to a conventional steel trap that is tripped by an animal treading on a disc like trip lever and to which my bait retainer is attached and being modified to conform to the disc tread plate and carried thereby.

Fig. 6 is a side view of the tread plate and bait clamp.

Fig. 7 is a fragmentary plan view of the base plate of Fig. 1, and having mounted thereon a modified means for securing the bait to a conventional trigger lever consisting of a coil tension for a loop to bind the bait to said lever.

Fig. 8 is a side view of Fig. 7.

The invention herein disclosed relates to an improvement in a bait securing means for animal trap, said animal trap having a base 1, a U-shaped striker 2 that is rockably connected near the longitudinal center of the base, at which point the striker is actuated by a coil spring 3 that is connected in such a way as to retain the free end of the striker to snug engagement with the front end as at A of said base and an arm 4, one end of which is rockably connected to the rear end of said base to lock the striker in a set position when rocked to said rear end of the plate. The free end of said arm extends forward to be engaged by a detent 5 to retain the striker in a set position, all of which relates to a conventional arrangement of a trap adapted to catching mice, rats, or the like, whereby such animals may be exterminated or partially so.

Heretofore the bait was placed on a lever member 6, rockably connected to the base plate adjacent the rockable connection of the said U-shaped striker and being in working relation to the said arm and lever, and to which the bait was applied and secured by tying the same to the lever, or by forcing a portion of the bait into an aperture extending through the lever, the latter securing means being very uncertain to retain some kinds of bait sufficiently to trip the trap; consequently, my invention to overcome such difficulty has proven satisfactory, and consists of upper and lower jaws 7 and 8, respectively, said jaws being pivotally connected as at 9 and being tensioned by a spring 10 to clamp the forward ends thereof toward each other, whereby bait is gripped between the teeth 11 of the jaws. It will be seen that the lower jaw has upturned sides A' coacting with its upturned teeth to form a receptacle for paste-like substance, such as butter, lard, or the like, inserted therein, and the rear end of said lower jaw has integrally joined thereto the said detent or catch that locks the arm against movement when the trap is set as above described. The upper jaw opposite its toothed end as at B is turned upward to function as a lever to open the jaws when pressed downward to place bait of a solid nature within the grip of the jaws so that a portion of said bait will extend outward from the teeth and through an aperture C positioned in the body of said upper jaw and the said aperture also is provided in the disc 12 of the steel trap illustrated in Fig. 5, the latter being a modification for the bait holder.

A further modification is illustrated in Figs. 7 and 8 consisting of a wire having a loop portion 13 that is tensioned by coil spring 14 to engagement with a trip lever 15 to clamp bait firmly thereon, the function of which is similar to the jaw illustrated in Figs. 1 and 2, and such other modifications may be employed as lie within the scope of the appended claims.

Having fully described my invention what I claim as new and desire to secure by Letters Patent is:

1. In a combined bait clamp and trigger for animal traps, a pair of jaws pivotally connected at their longitudinal center and a spring to rock the jaws to engagement at one of their corresponding ends, one of said jaws being rockably connected to a base plate of an animal trap, and means adjacent the rockable point of the said one jaw to retain the trap in a set position and to release the same by a rocking movement of the said one jaw, and the said one jaw having flanges turned at right angle from the same side of the jaw to form a receptacle for bait therein.

2. In a bait clamp for animal traps, an upper and a lower jaw, each of a suitable length and width and being rockably connected near their longitudinal centers, both of said jaws having a portion of their corresponding ends turned toward each other and being toothed for lapped engagement of the teeth, and the said jaws having a spring to cause said engagement of the teeth, the upper jaw being apertured between its toothed portion and the rockable connection of said jaws, and oppositely disposed turned up edges for the other jaw between its toothed portion and said rockable connection to form a container, and means at the end of the lower jaw opposite its toothed end to rockably connect the same to a base plate of an animal trap and the said lower jaw having an upturned portion from its rockable connection with the base plate to function as a detent for the animal trap in its set position when the jaws are rocked upward and to release the set position by a downward rock of the jaws.

LEIGH E. JOHNSON.